United States Patent
Maeda et al.

(10) Patent No.: US 7,610,134 B2
(45) Date of Patent: Oct. 27, 2009

(54) VEHICLE STEERING SYSTEM

(75) Inventors: Shingo Maeda, Kashiwara (JP);
Masanori Arima, Nara (JP); Naoki Maeda, Kashihara (JP); Kosuke Yamanaka, Kashiwara (JP); Atsushi Ishihara, Yamatokoriyama (JP);
Tatsuma Kouchi, Kashiwara (JP);
Daisuke Maeda, Kashiwara (JP)

(73) Assignee: Jtekt Corporation, Osaka-shi (JP)

( * ) Notice: Subject to any disclaimer, the term of this patent is extended or adjusted under 35 U.S.C. 154(b) by 0 days.

(21) Appl. No.: 11/760,402

(22) Filed: Jun. 8, 2007

(65) Prior Publication Data
US 2007/0288145 A1 Dec. 13, 2007

(30) Foreign Application Priority Data
Jun. 13, 2006 (JP) .............................. 2006-163746

(51) Int. Cl.
*B62D 6/00* (2006.01)
*B62D 1/00* (2006.01)
*B62D 15/00* (2006.01)

(52) U.S. Cl. ............................. 701/41; 701/23; 701/42; 701/43; 180/204; 180/6.24

(58) Field of Classification Search ............. 701/23–25, 701/36, 41–43, 70, 93, 97, 300, 72, 76, 78, 701/79, 91, 96; 180/204, 6.24; 340/932.2
See application file for complete search history.

(56) References Cited

U.S. PATENT DOCUMENTS

| | | | | |
|---|---|---|---|---|
| 5,025,379 A | * | 6/1991 | Etoh et al. | 701/97 |
| 6,170,591 B1 | * | 1/2001 | Sakai et al. | 180/204 |
| 6,198,992 B1 | * | 3/2001 | Winslow | 701/23 |
| 6,256,561 B1 | * | 7/2001 | Asanuma | 701/41 |
| 6,502,907 B2 | * | 1/2003 | Nakano | 303/155 |
| 7,075,456 B2 | * | 7/2006 | Tanaka et al. | 340/932.2 |
| 2005/0125115 A1 | * | 6/2005 | Hiwatashi et al. | 701/25 |
| 2006/0089770 A1 | * | 4/2006 | Ito | 701/41 |

FOREIGN PATENT DOCUMENTS

| JP | 10-114272 | 5/1998 |
|---|---|---|
| JP | 2998864 | 11/1999 |

OTHER PUBLICATIONS

U.S. Appl. No. 11/758,902, filed Jun. 6, 2007, Maeda et al.
U.S. Appl. No. 11/760,311, filed Jun. 8, 2007, Arima et al.
U.S. Appl. No. 11/760,206, filed Jun. 8, 2007, Arima et al.

* cited by examiner

Primary Examiner—Jack W. Keith
Assistant Examiner—Matthew Lichti
(74) Attorney, Agent, or Firm—Oblon, Spivak, McClelland, Maier & Neustadt, L.L.P.

(57) ABSTRACT

A brake application speed is compared with a speed threshold value so as to judge whether or not a braking operation being performed is an emergency braking operation. If not the emergency braking operation, an automatic parking mode is held. When the emergency braking operation is in effect, control information related to a state of an automatic parking control then is stored in a control information storage section, and the automatic parking control is cancelled. Thereafter, when a steering operation or a gearshift operation is performed before a cancellation of application of the brake is detected, the process is ended, and the control mode is held in an assist mode. When the application of the brake is cancelled with neither the steering operation nor the gearshift operation performed, the control information is read in so as to resume the automatic parking control.

3 Claims, 3 Drawing Sheets

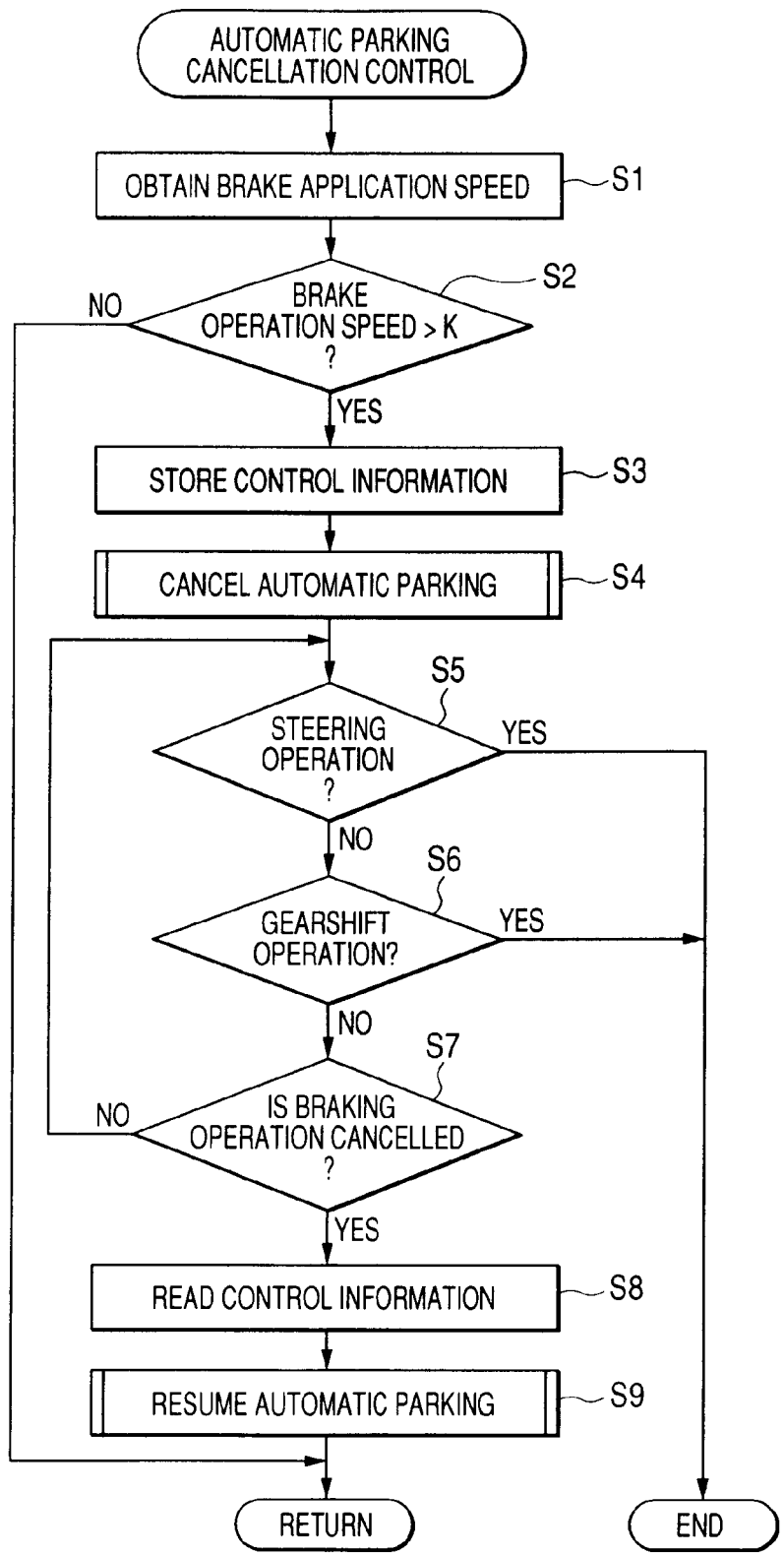

VEHICLE STEERING SYSTEM

This application is based on and claims a priority from a Japanese Patent Application No. 2006-163746 filed on Jun. 13, 2006, the entire contents of which are incorporated by reference.

BACKGROUND OF THE INVENTION

The present invention relates to a vehicle steering system which can perform an automatic steering control and cancel the control.

There are proposed techniques for performing an automatic steering of a vehicle by making use of a steering actuator provided on the vehicle. For example, a power steering system installed on a vehicle includes an electric motor or a hydraulic actuator as a steering actuator for imparting a steering force (a steering assist force) to a steering mechanism. Then, steered road wheels of the vehicle can be turned by controlling the output of the steering actuator without involving the manipulation of a steering wheel by the driver.

More specifically, in an automatic parking assist control, a target traveling path from a current position to a parking position of the vehicle is calculated, and a relationship of a target turning angle with a traveling distance of the vehicle is obtained so that the vehicle is reversed along the target traveling path so calculated. Then, the steering actuator is controlled based on a steering angle command value which is determined so as to attain a target turning angle according to a traveling distance of the vehicle. At this time, the driver only has to perform the adjustment of stopping position as well as the adjustment of vehicle speed by controlling the brake and accelerator pedals and does not have to manipulate the steering wheel.

During the automatic steering control is in effect, in the case that the driver finds an obstacle when the driver carefully looks at conditions in a traveling direction and on the periphery of the vehicle, the driver is required to apply the brake as soon as possible to stop the vehicle. To this end, in the related art described in JP-H10-114272A, an automatic parking control is designed to be implemented by making use of a creeping force of a vehicle equipped with an automatic transmission only when the brake are applied. Consequently, when finding an obstacle, the driver can manipulate a brake application device as soon as possible so as to stop the vehicle. In addition, when the driver gives up parking the vehicle during automatic parking control and starts the vehicle, the automatic parking control is designed to be cancelled by stopping the manipulation of the brake application device.

However, in the case that the driver stops manipulating the brake application device in order to cancel the automatic parking control after the driver found the obstacle in the traveling direction of the vehicle and has stopped the vehicle, there exists a fear that the vehicle continues to move towards the obstacle due to the creeping force and then eventually comes into contact with the obstacle. In addition, since the automatic parking control has not yet been cancelled in such a state that the vehicle is stopped while keeping the brake application device manipulated, when the driver attempts to avoid the obstacle by manipulating the steering wheel, the steering force inputted by the driver and the torque generated as a result of the automatic parking control are caused to interfere with each other. Because of this, the driver cannot smoothly move on to a subsequent driving operation after the driver has stopped the vehicle.

On the other hand, an automatic steering control system is disclosed in JP2998864B in which automatic steering is cancelled when the application of the brake is detected. However, the system cannot be applied to the automatic parking control in which the application of the brake is inevitable. Namely, if the system disclosed in JP2998864B is applied to the automatic parking control, the automatic parking control is cancelled without any delay by the application of the brake by the driver. Thus, the driver has to perform again the automatic parking mode setting operation or parking position setting operation. Consequently, once the brake is applied, the operation process for resuming the cancelled automatic parking control becomes complicated and troublesome. Therefore, the disclosed system cannot be put into practical use for the automatic parking control.

In this way, the conventional automatic steering function such as the automatic parking has the drawback that the driver cannot smoothly move on to a driving operation subsequent to the application of the brake, and this function is not necessarily easy for the driver to use.

SUMMARY OF THE INVENTION

Then, an object of the invention is to provide a vehicle steering system which enables the driver to smoothly move on to a driving operation subsequent to the application of the brake, so as to make the automatic steering function easy to be used.

With a view to attaining the object, according to a first aspect of the invention, there is provided a vehicle steering system comprising:

a steering actuator (M) that imparts a steering force to a steering mechanism (1) of a vehicle;

an automatic steering controller (22) that performs an automatic steering control by controlling the steering actuator;

a manipulation urgency detector (19, S1) that detects a degree of manipulation urgency of a brake application member (9) which is manipulated by the driver for applying the brake to the vehicle;

an automatic steering cancellation controller (24, S2, S4) that cancels the automatic steering control by the automatic steering controller when the degree of manipulation urgency detected by the manipulation urgency detector exceeds a predetermined threshold value (K);

a control resumption data storage (24M, S3) that stores control resumption data for resumption of the automatic steering control when the automatic steering control cancellation controller cancels the automatic steering control; and an automatic steering resuming unit (25, S8, S9) that resumes the automatic steering control by the automatic steering controller using the control resumption data stored in the control resumption data storage when a predetermined control resuming condition is established.

Note that parenthesized numerals, numerals with a character and characters represent corresponding constituent elements and the like in an embodiment which will be described later on.

According to the configuration that has been described above, the automatic steering control is cancelled in no case within a range where the manipulation urgency of the brake application member does not exceed the predetermined threshold value. In addition, since the automatic steering control is cancelled when the manipulation urgency of the brake application member exceeds the threshold value, the interference between the driving operation which the driver is to perform subsequently and the automatic steering control can be suppressed or prevented, the smooth shift to the driving operation subsequent to the application of the brake is enabled. In addition, when the predetermined control resuming condition is established, the automatic steering control can be resumed using the control resumption data without requiring a resetting operation by the driver. Thus, the automatic steering system which is improved in handling can be realized in the way described above.

According to a second aspect of the invention, there is provided a vehicle steering system as set forth in the first aspect of the invention, wherein the control resuming condition includes a cancellation of the application of the brake without involving a steering operation or a gearshift operation by the driver after the automatic steering control has been cancelled by the automatic steering cancellation controller.

According to the configuration that has been described above, the automatic steering control can be resumed by canceling the application of the brake without involving the steering operation or gearshift operation. In addition, when the steering operation or gearshift operation is performed before the application of the brake is cancelled, since the automatic steering control has already been cancelled then, the steering operation or gearshift operation interferes in no case with the automatic steering control. Consequently, a smooth shift to the steering operation or gearshift operation is enabled after emergency braking during the automatic steering control.

In addition, the manipulation urgency detector may include a manipulation speed detector (19) for detecting a manipulation speed of the brake application member. In addition, the manipulation urgency detector may include a manipulation force detector (35) for detecting a manipulation force of the brake application member.

Furthermore, in the case of the second aspect of the invention, the vehicle steering system preferably includes a brake cancellation detector (35) for detecting the cancellation of the application of the brake. In addition, the vehicle steering system preferably includes a steering operation detector (11, 17) for detecting whether or not a steering operation has been performed. In addition, the vehicle steering system preferably includes a gearshift operation detector (18) for detecting whether or not a gearshift operation has been performed. The steering operation detector may includes a steering operation amount detector (11, 17) for detecting a manipulating amount (a manipulating angle or a manipulating torque) of a control member (5) for controlling the traveling direction of the vehicle. The gearshift operation detector may be a device for detecting change of a transmission position (shift position) of a transmission of the vehicle.

BRIEF DESCRIPTION OF THE DRAWINGS

FIG. 3 is a flowchart which describes the operation of an automatic parking cancellation controller provided in the controller.

DETAILED DESCRIPTION OF PREFERRED EMBODIMENTS

Hereinafter, embodiments of the invention will be described in detail by reference the accompanying drawings.

Figure 1:
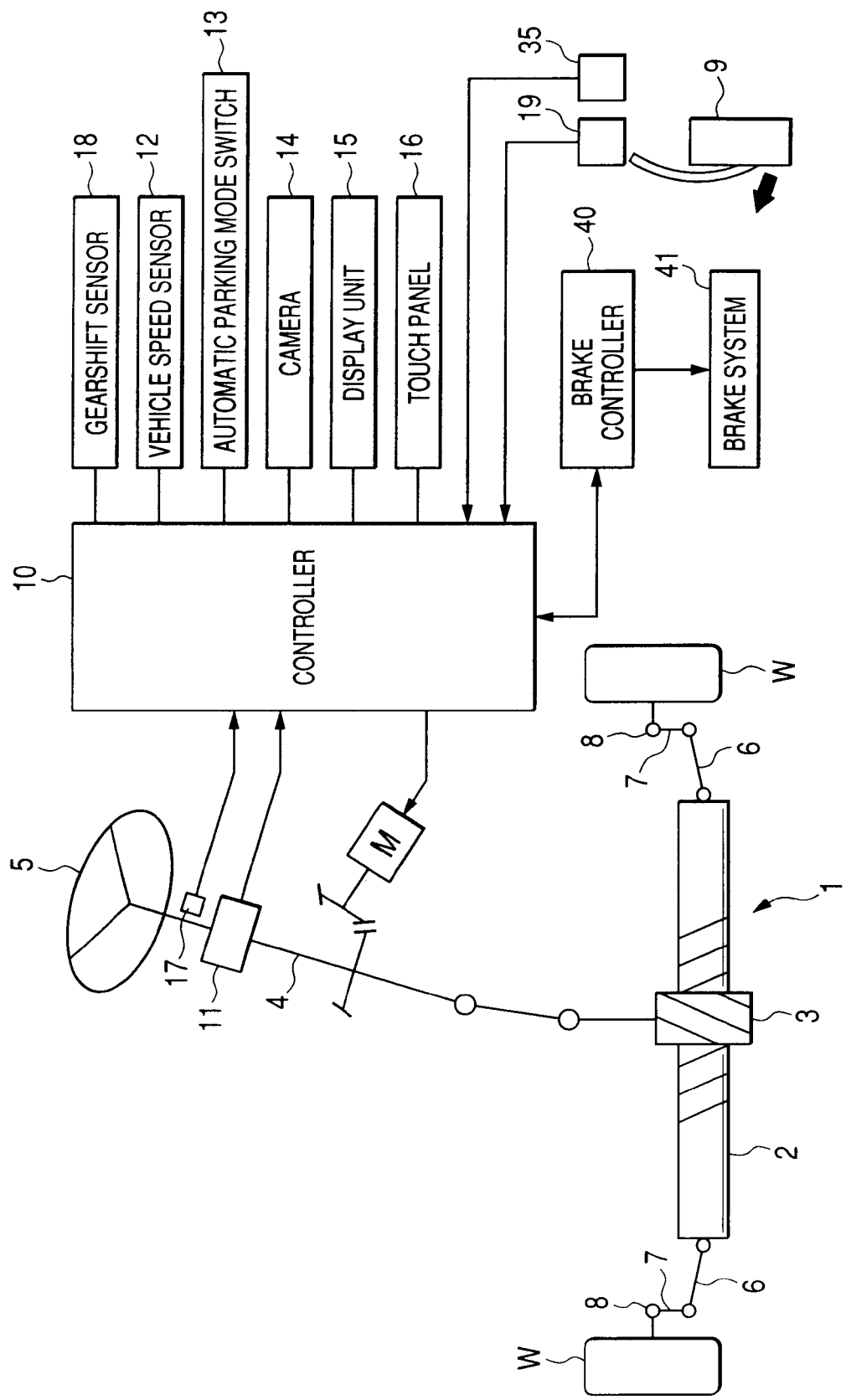
FIG. 1 is a conceptual diagram which describes the configuration of an electric power steering system which constitutes an embodiment of a vehicle steering system of the invention.

FIG. 1 is a conceptual diagram which describes the configuration of an electric power steering system as a vehicle steering system according to an embodiment of the invention. The electric power steering system is configured such that torque generated by an electric motor M functioning as a steering actuator is transmitted to a steering mechanism 1 for turning steered road wheels W (for example, left and right front road wheels) of a vehicle. The steering mechanism 1 is a rack-and-pinion type steering mechanism which includes a rack shaft 2 which extends along a lateral direction of the vehicle and a pinion 3 which meshes with a gear portion of the rack shaft 2. One end of a steering shaft 4 is connected to the pinion 3, while a steering wheel 5 functioning as a control member is connected to the other end of the steering shaft 4. Consequently, when the steering wheel 5 is manipulated to rotate, the rotation of the steering wheel 5 is transmitted to the rack shaft 2 via the steering shaft 4 and the pinion 3 so as to be transformed into an axial displacement of the rack shaft 2.

Ends of a pair of tie rods 6 are connected to ends of the rack shaft 2, respectively. The other ends of the pair of tie rods 6 are connected to ends of a pair of knuckle arms 7, respectively. The pair of knuckle arms 7 are supported rotatably around a pair of king pins 8, respectively, and are connected to the pair of steered road wheels W via the king pins 8, respectively. In this configuration, when the rack shaft 2 is displaced in an axial direction, the knuckle arms 7 rotate around the king pins 8, respectively, whereby the steered wheels W are turned.

In order to impart a proper steering force to the steering mechanism 1, a controller (an ECU: Electronic Control Unit) 10 is provided for controlling the electric motor M. The controller 10 is designed to receive output signals which are inputted thereinto from a torque sensor 11 for detecting a manipulating torque imparted to the steering wheel 5, a manipulating angle sensor 17 for detecting a manipulating angle of the steering wheel 5 by detecting a rotational angle of the steering shaft 4, a vehicle speed sensor 12 for detecting a vehicle speed of the vehicle on which the electric power steering system is installed, a gearshift sensor 18 for detecting a gear position (a shift position) in a transmission of the vehicle, a braking speed sensor 19 for detecting a manipulating speed (a depressing speed, a brake application speed) of a brake pedal 9 which is depressed by the driver to apply the brake, and a pedal pressure sensor 35 for detecting a depressing force (a pedal pressure) which is applied by the driver to depress the brake pedal 9. In addition, an output of an automatic parking mode switch 13 for setting and canceling an automatic parking mode is further given to the controller 10, and a video signal is inputted into the controller 10 from a camera 14 for sensing an image at the rear of the vehicle. Furthermore, a display unit 15 (for example, a liquid crystal display unit or other graphic display unit) which is disposed in the vicinity of a driver's seat of the vehicle is connected to the controller 10. An output signal of a touch panel 16 provided on a display screen of the display unit 15 is designed to be inputted into the controller 10. Furthermore, a brake controller (ECU: Electronic Control Unit) for controlling a brake system 41 of the vehicle is also connected to the controller 10.

When the automatic parking mode is instructed to be performed by manipulation of the automatic parking mode switch 13, the controller 10 controls the electric motor M according to the automatic parking mode in which a steering control (an automatic parking control) is performed for automatic parking of the vehicle. In addition, when a cancellation of the automatic parking mode is instructed by manipulation of the automatic parking mode switch 13, the controller 10 cancels the automatic parking control and controls the electric motor M according to an assist mode. The assist mode means a control mode for causing the electric motor M to generate a steering assisting force to assist the driver in manipulating the steering wheel 5 based on a manipulating torque detected by the torque sensor 11 and a vehicle speed detected by the vehicle speed sensor 12.

Figure 2:
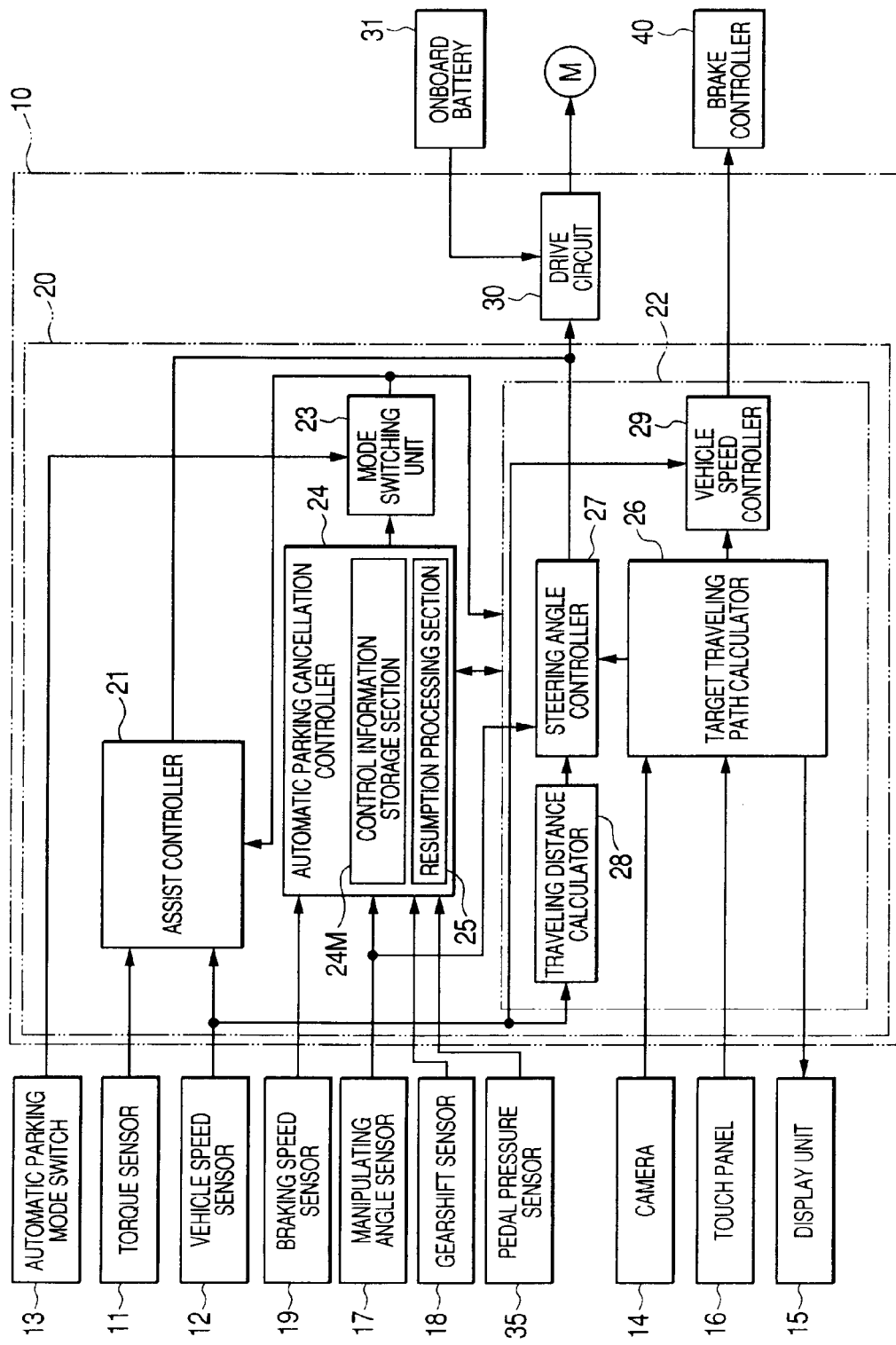
FIG. 2 is a block diagram which describes an electrical configuration of a controller provided in the vehicle steering system.

FIG. 2 is a block diagram which describes an electrical configuration of the controller 10. The controller 10 includes a microcomputer 20 and a drive circuit 30 for supplying electric power from an onboard battery 31 to the electric motor M.

The microcomputer 20 includes a CPU (Central Processing Unit) and a memory (ROM, RAM and the like) and performs functions of a plurality of functional processing units. The functional processing units include an assist controller 21 for controlling the electric motor M according to the assist mode, an automatic parking controller 22 for controlling the electric motor M according to the automatic parking mode, a mode switching unit 23 for switching the mode of the electric power steering system between the automatic parking mode and the assist mode, and an automatic parking cancellation controller 24 for canceling the automatic parking control by the automatic parking controller 22 so as to shift the mode of the electric power steering system from the automatic parking mode to the assist mode when a predetermined condition is established.

The mode switching unit 23 selects a control by either of the assist controller 21 or the automatic parking controller 22 and makes the control so selected effective, whereby the automatic parking mode and the assist mode are switched therebetween. Accordingly, this mode switching unit 23 not only switches the control mode according to the setting by the automatic parking mode switch 13 but also switches the control mode between the automatic parking mode and the assist mode according to an instruction from the automatic parking cancellation controller 24 during the automatic parking mode is performed.

Since the manipulating angle sensor 17 detects a manipulating angle of the steering wheel 5 which is mechanically connected to the steering mechanism 1, the manipulating angle sensor 17 also detects an actual steering angle (an actual turning angle) of the steering mechanism 1 at the same time as the detection of a manipulating angle of the steering wheel 5.

The automatic parking cancellation controller 24 determines whether or not the automatic parking control is to be cancelled based on an output signal of the manipulating angle sensor 17, an output signal of the gearshift sensor 18, an output signal of the braking speed sensor 19 and an output signal of the pedal pressure sensor 35 and gives an instruction to cancel the automatic parking control to the mode switching unit 23 when the automatic parking control is to be cancelled. The automatic parking cancellation controller 24 includes a control information storage section 24M for storing control information which is information related to a state of the automatic parking control resulting immediately before the automatic parking control is cancelled prior to the cancellation and a resumption processing section 25 for resuming the automatic parking control which has been temporarily cancelled under a predetermined condition. When it is judged that a brake application speed detected by the braking speed sensor 19 exceeds a predetermined threshold value K, it is judged that the braking operation is an emergency braking operation and the automatic parking cancellation controller 24 cancels the automatic parking control Prior to this cancellation, the automatic parking cancellation controller 24 obtains control information related to a state of the automatic parking control at this moment from the automatic parking controller 22 and stores it in the control information storage section 24M. On the other hand, after the automatic parking control is cancelled, referring to the output signals from the manipulating angle sensor 17 and the gearshift sensor 18, the resumption processing section 25 monitors whether or not a manipulation of the steering wheel 5 (a steering operation) or a gearshift operation is performed before a cancellation of the application of the brake is detected by the pedal pressure sensor 35. In the event that the cancellation of the application of the brake is detected with neither the steering operation nor the gearshift operation performed, the resumption processing section 25 reads out the control information stored in the control information storage section 24M to give the information so read out to the automatic parking controller 22 and give to the mode switching unit 23 a instruction to restore the automatic parking mode (an automatic parking resumption instruction).

The assist controller 21 determines a motor target current value which corresponds to a manipulating torque that is detected by the torque sensor 11 and a vehicle speed that is detected by the vehicle speed sensor 12. More specifically, the assist controller 21 sets a motor target current value according to an assist characteristic which determines a motor target current value which corresponds to the manipulating torque and the vehicle speed and controls the electric motor M via the drive circuit 30 so that the motor target current value is attained. The assist characteristic is stored in advance in the memory within the microcomputer 20 in the form of a map (a table), for example. This assist characteristic is determined such that for example, the motor target current value is set larger as the absolute value of the manipulating torque becomes larger and the motor target current value is set smaller as the vehicle speed becomes faster.

The automatic parking controller 22 includes a target traveling path calculator 26 for calculating a target traveling path from a current position to a target parking position of the vehicle, a steering angle controller 27 for controlling a steering angle according to the target traveling path calculated by the target traveling path calculator 26, a traveling distance calculator 28 for calculating a traveling distance based on an output signal of the vehicle speed sensor 12, and a vehicle speed controller 29 for limiting the vehicle speed while the automatic parking control is in operation.

The target traveling path calculator 26 calculates a target traveling path based on a video image sensed by the camera 14 and an input from the touch panel 16. More specifically, when the driver manipulates the automatic parking mode switch 13 to designate the automatic parking mode, a video image outputted by the camera 14 is displayed on the display unit 15. Then, the driver designates a desired parking position using the touch panel 16 with referring to the video image displayed on the display unit 15. Consequently, at this time, the touch panel 16 functions as a parking position designation device. When the parking position is designated in this way, the target traveling path calculator 26 calculates a positional relationship between the current position of the subject vehicle and the designated parking position and furthermore obtains a path which avoids an obstacle that is recognized from the video image sensed by the cameral 14 as a target traveling path. The traveling path so calculated may be displayed on the display unit 15.

The target traveling path calculator 26 stores information on the target traveling path in the memory in the form of steering control table data which is table data which represents a relationship between a traveling distance over which the vehicle travels from the current position to the target parking position thereof and a target steering angle which corresponds to the traveling distance. The steering angle controller 27 controls the electric motor M by referring to the steering control table data. Namely, the steering angle controller 27 obtains a target steering angle, corresponding to a traveling distance of the vehicle which is inputted from the traveling distance calculator 28, from the steering control table data based on the traveling distance. The steering angle controller 27 controls the electric motor M via the drive circuit 30 so that the target steering angle so obtained is attained, that is, the actual steering angle detected by the steering angle sensor 17 follows the target steering angle.

The vehicle speed controller 29 determines a vehicle speed upper limit value and monitors an output of the vehicle speed sensor 12 so as to issue a brake application request to a brake controller 40 when the vehicle speed reaches the vehicle speed upper limit value. In response to this, the brake controller 40 controls the brake system 41 (refer to FIG. 1) so as to suppress the vehicle speed in such a manner as to stay below the vehicle speed upper limit value.

During the automatic parking, basically, the driver does not manipulate the steering wheel but manipulates the accelerator pedal and the brake pedal so as to adjust the speed of the vehicle, as well as to adjust a stopping position. While this is being performed, the steering angle of the steering mechanism 1 is automatically adjusted every moment by the electric motor M which is controlled by the automatic parking controller 22. In addition, when the vehicle speed reaches the vehicle speed upper limit value, the brake controller 40 intervenes in the adjustment of vehicle speed by the driver, so as to perform a speed reduction control.

FIG. 3 is a flowchart which describes an operation which is performed repeatedly on a predetermined control cycle by the automatic parking cancellation controller 24 during the automatic parking mode. The automatic parking cancellation controller 24 obtains a brake application speed detected by the braking speed sensor 19 (step S1). At the time of emergency such as when an obstacle is located in a traveling direction of the vehicle, the driver attempts to depress the brake pedal 9 as quickly as possible and strongly. Consequently, a brake application speed detected by the braking speed sensor 19 can be used as an index which represents the urgency of braking operation. Then, the automatic parking cancellation controller 24 compares a detected brake application speed with the predetermined speed threshold K to thereby judge whether or not a braking operation being performed is an emergency braking operation (step S2) When the brake application speed detected is equal to or less than the speed threshold value K and hence the braking operation being performed is judged as not being the emergency braking operation (step S2: NO), the automatic parking cancellation controller 24 does not perform processes in subsequence steps in the flowchart shown in FIG. 3 but holds the automatic parking mode.

On the other hand, when the brake application speed exceeds the speed threshold value K (step S2: YES), the automatic parking cancellation controller 24 judges the braking operation being performed as being the emergency braking operation. Then, the automatic parking cancellation controller 24 obtains control information related to the state of the automatic parking control at this moment from the automatic parking controller 22 and stores it in the control information storage section 24M (step S3) and issues an automatic parking cancellation instruction to the mode switching unit 23 (step S4). In response to this, the mode switching unit 23 switches the control mode to the assist mode.

Following this, referring to an output signal from the pedal pressure sensor 35, an output signal from the manipulating angle sensor 17 and an output signal from the gearshift sensor 18, the resumption processing section 25 judges whether or not a manipulation of the steering wheel 5 is detected by the manipulating angle sensor 17 (step 5) and a gearshift operation (for example, a gearshift operation in which the gear position is shifted from the reverse gear position to a forward gear position) is detected by the gearshift sensor 18 (step S6) before a cancellation of the application of the brake is detected by the pedal pressure sensor 35 (step 7). If the steering operation or the gearshift operation is detected (step 5: YES, step S6: YES) before the cancellation of the application of the brake, the automatic parking cancellation controller 24 ends the processing and holds the control mode in the assist mode, whereby when the driver stops the vehicle in an emergency so as to move on to a subsequent driving operation (a steering operation or gearshift operation), since the automatic parking control has already been cancelled at this time, the driving operation does not interfere with the automatic parking control, whereby the driver can smoothly move on to a subsequent driving operation such as avoiding the obstacle or restarting the vehicle as a result of giving up the desired parking after the driver has stopped the vehicle in an emergency.

On the other hand, if the cancellation of application of the brake is detected by the pedal pressure sensor 35 (step S7: YES) without involving either the steering operation or the gearshift operation (step S5: NO, step S6: NO), the resumption processing unit 25 reads in the control information from the control information storage section 24M (step S8), so as to resume the automatic parking control (step S9). Namely, the resumption processing section 25 gives to the automatic parking controller 22 the control information read in from the control information storage section 24M so as to keep the automatic parking control going on, and gives an automatic parking resuming instruction to the mode switching unit 23. In response to this, the mode switching unit 23 switches the control mode from the assist mode to the automatic parking mode. The automatic parking control, which has been temporarily interrupted or cancelled by the manipulation of the brake pedal 9 in an emergency, can be resumed to be kept going on by the use of the control information which resulted and was taken in immediately before the cancellation in the way mentioned above, whereby the driver can resume the automatic parking control smoothly without involving a troublesome resetting operation such as manipulation of the automatic parking mode switch 13 or manipulation of the touch panel 16 for designation of the parking position.

In this way, according to the embodiment, the automatic parking control is not cancelled by a normal braking operation but is designed to be cancelled when a braking operation is performed which is so fast that the relevant operation is regarded as an emergency braking operation, whereby the automatic parking control is allowed to be cancelled only when necessary, and after the automatic parking control is cancelled, the driver can smoothly move on to the subsequent steering operation or gearshift operation. On the other hand, when the braking operation is cancelled without involving a steering operation or gearshift operation after the emergency braking operation is performed, the automatic parking control is resumed by the use of the control information resulting and taken in immediately before the cancellation. Consequently, the automatic parking can be resumed without requiring the troublesome resetting operations. In this way, usability of the automatic parking function can be enhanced.

While the embodiment of the invention has been described heretofore, the invention can be implemented in other forms. For example, while in the embodiment that has been described above, the manipulating angle sensor 17 for detecting the manipulating angle of the steering wheel 5 as the control member is used for detecting the actual steering angle of the steering mechanism 1, the actual steering angle can be detected by using an output from a rack traveling amount sensor for detecting a traveling amount of the rack shaft 2, or the actual steering angle can be detected by detecting a rotational angle of the electric motor M.

In addition, while in the above embodiment, the braking speed sensor 19 is used for detecting the urgency of the braking operation, for example, a pedal pressure detected by the pedal pressure sensor 35 or a speed at which the pedal pressure changes may be used as an index representing the urgency in place of the brake application speed or together with the brake application speed.

Furthermore, while in the above embodiment, the output signal from the manipulating angle sensor 17 is used for detecting whether or not the steering operation has been performed, a manipulating torque detected by the torque sensor 11 may be used to judge whether or not the steering operation has been performed.

Furthermore, while in the above embodiment, the invention is described as being applied to the electric power steering system, the invention can be widely applied to vehicle steering systems in which a steering actuator is provided for imparting a steering force to a steering mechanism of a vehicle. These vehicle steering systems include a so-called steer-by-wire system, a hydraulic power steering system and the like. The steer-by-wire system means a system in which a mechanical connection between a control member such as a steering wheel or the like is eliminated, so that a manipulating amount of the control member is detected by a sensor and a driving force of a steering actuator which is controlled according to an output from the sensor is transmitted to the steering mechanism.

In addition, while in the above embodiments, the automatic parking control is raised as the example of the automatic steering control, the invention can also be applied to other types of automatic steering controls such as an automatic steering control for causing a vehicle to be driven automatically along a driving lane.

The embodiments described above are to be regard as illustrative rather than restrictive. Variations and changes may be made by others, and equivalents employed, without departing from spirit of the present invention. Accordingly, it is intended that all variations, changes and equivalents which fall within the spirit and scope of the present invention as defined in the claims be embraced thereby.

What is claimed is:

1. A vehicle steering system comprising:
   a steering actuator configured to impart a steering force to a steering mechanism of a vehicle;
   an automatic steering controller configured to perform automatic steering control by controlling the steering actuator;
   a manipulation urgency detector configured to detect a degree of manipulation urgency of a vehicle brake application member which is manipulated by the driver;
   an automatic steering cancellation controller configured to cancel the automatic steering control by the automatic steering controller when the degree of manipulation urgency detected by the manipulation urgency detector exceeds a predetermined threshold value;
   a control resumption data storage configured to store control resumption data for resumption of the automatic steering control when the automatic steering control cancellation controller cancels the automatic steering control; and
   an automatic steering resuming unit configured to resume the automatic steering control by the automatic steering controller using the control resumption data stored in the control resumption data storage when a predetermined control resuming condition is established,
   wherein the automatic steering resuming unit includes
   means for determining the cancellation of braking after the automatic steering control has been cancelled by the automatic steering cancellation controller,
   means for determining a steering operation after the automatic steering control has been cancelled by the automatic steering cancellation controller,
   means for determining a gearshift operation by the driver after the automatic steering control has been cancelled by the automatic steering cancellation controller, and
   means for resuming the automatic steering control by the automatic steering controller after the automatic steering control has been cancelled by the automatic steering cancellation controller when the means for determining the cancellation of braking after the automatic steering control has been cancelled by the automatic steering cancellation controller determines that a braking application has been cancelled, the means for determining a steering operation after the automatic steering control has been cancelled by the automatic steering cancellation controller makes a determination of no steering operation, and the means for determining a gearshift operation by the driver after the automatic steering control has been cancelled by the automatic steering cancellation controller makes a determination of no gearshift operation.

2. The vehicle steering system according to claim 1, wherein the manipulation urgency detector includes a manipulation speed detector for detecting a manipulation speed of the brake application member.

3. The vehicle steering system according to claim 1, wherein the manipulation urgency detector includes a manipulation force detector for detecting a manipulation force of the brake application member.

* * * * *